Jan. 5, 1943. H. F. GADE Re. 22,243

SELF-LOCKING NUT

Original Filed Oct. 22, 1941

Inventor:-
Harald F. Gade
by his Attorneys
Howson & Howson

Reissued Jan. 5, 1943

Re. 22,243

UNITED STATES PATENT OFFICE 22,243

SELF-LOCKING NUT

Harald F. Gade, Philadelphia, Pa., assignor to Pennsylvania Manufacturing Company, Jenkintown, Pa., a corporation of Delaware Original No. 2,290,175, dated July 21, 1942, Serial No. 416,121, October 22, 1941. Application for reissue November 4, 1942, Serial No. 464,500

4 Claims. (Cl. 10—86)

This invention relates to self-locking nuts of the type disclosed in my co-pending application Serial No. 393,824.

The principal object of the present invention is to provide an improved method for manufacturing nuts of that type.

The nuts to which the invention pertains are provided at one end with a plurality of locking segments which are formed so as to constrict the normal bore of the nut and which are resiliently displaceable in the radial direction, so that when the nut is applied to the companion bolt, the segments will exert a resilient pressure against the sides of the bolt to lock the nut in place. Conventionally, the inner threaded faces of the segments are formed on an arc having the same radius as the normal bore of the nut, and the side edges of the segments have a tendency to scrape the surfaces of the bolt, which is undesirable, particularly where the bolt and nut are coated or plated with cadmium or other rust-inhibiting material. In such cases, the scraping action of the side edges of the locking segments will sometimes remove the protective coating and expose the ferrous metal of the bolt to oxidation.

In my aforesaid application, a means was described for avoiding this undesirable characteristic by increasing the radius of curvature of the inner faces of the locking segments, so that the side edges of the segments were removed from direct contact with the bolt. The present invention affords a more economical method of achieving the same result.

In the attached drawing.

Figure 1:
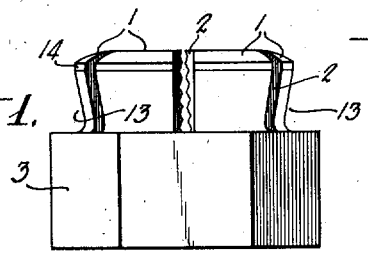
Figure 1 is a side elevational view of a nut made in accordance with my invention.
Figure 2:
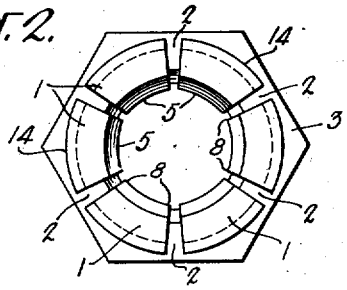
Figure 2 is a top plan view of the nut.
Figure 3:
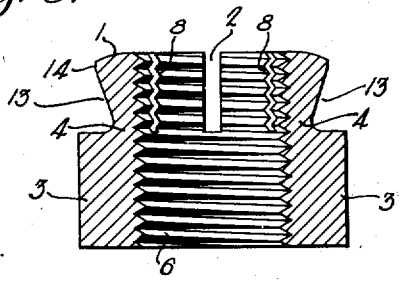
Figure 3 is a sectional view illustrating the nut in an early stage of manufacture.

With reference to Figs. 1 and 2 of the drawing, the nut therein illustrated as an embodiment of the invention is provided at its upper or outer end with a plurality of segments 1 which may be formed by slotting the body of the nut longitudinally and radially from said upper end as indicated at 2. Preferably, the segments 1 are under-cut at the outside of the nut, so that they are joined to the body 3 of the nut by a relatively small section 4 of metal, thereby affording the segments a suitable degree of resiliency in the radial direction consistent with their locking function as hereinafter set forth.

Figure 7:
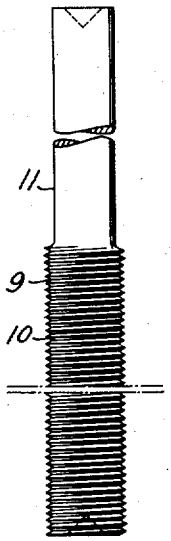
Figures 7 and 8 are views illustrating tools that may be used in production.
Figure 8:
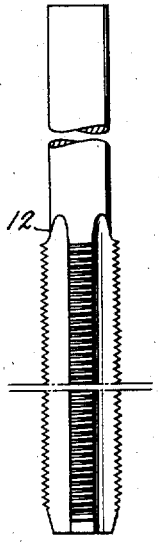

In producing this nut in accordance with the present invention, the nut blank of the desired form, such, for example, as that shown in Fig. 1, may be slotted at one end to provide the kerfs 2 which define the sides of the several locking segments. The blank may then be tapped in the usual manner to provide the thread of desired pitch and pitch diameter. Preferably, the slotting of the nut precedes the tapping operation, although these two steps may be reversed without departure from the invention. In either case, I have found it desirable, after the tapping and slotting operations, to pass the nut onto and over a threaded mandrel 9, see Fig. 7, having a corresponding thread, the purpose of this operation being, in effect, to work in the thread and to remove the burrs which may exist as a result of the slotting and threading operations. In this operation, the nuts may be fed successively over the length of the threaded portion 10 of the mandrel and from the threaded portion onto the unthreaded shank 11 from which the nuts may readily be removed. In lieu of the mandrel 9, an elongated tap 12 may be used, of the general form illustrated in Fig. 8, the nuts being passed over the extended threaded portion of the tap in the manner described above and onto the unthreaded shank for subsequent removal.

Figure 4:
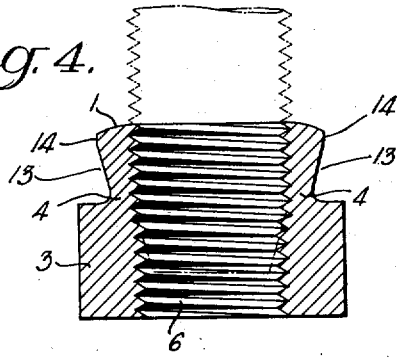
Figures 4 and 5 are corresponding sectional views illustrating subsequent steps in the process of manufacture.

Following the slotting and tapping operations, described above, and in accordance with the present invention, I then re-tap the segmented end of the nut to a point, preferably, slightly below the inner ends of the slots 2, using in this step a tap having a slightly larger pitch diameter. This step is illustrated in Fig. 4. As a result of this operation, the thread on the inner faces 5 of the segments 1, while being a true continuation of the threads in the bore 6, will have a slightly larger pitch diameter, the effect being clearly shown in the drawing.

Figure 5:
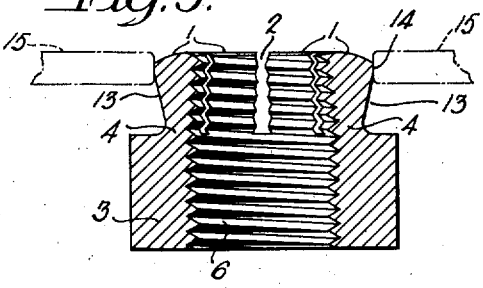

The next step consists in displacing the several segments 1 inwardly in the radial direction so that they are permanently set in the positions shown in Fig. 5. By reason of this set, the inner faces of the segments converge toward the axis of the bore 6, so that the segments constrict the normal bore 6 and offer an obstruction to the free passage of the nut on to the bolt. The inward displacement of the segments 1 may be effected in any suitable manner such for example, as that described in my aforesaid co-pending application. It is to be noted, however, that in the present instance, the outer surfaces of the segments 1 are undercut by an annular recess 13 which is of such character as to leave at the outer ends of the segments and on the outer surfaces thereof a narrow shoulder 14 which form an abutment for the dies 15 by means of which the segments are inwardly displaced under pressure. This relatively narrow contact area between the offsetting dies 15 and the segments 1 is desirable in order to insure a uniform and accurately gauged degree of displacement. It is important, in order to obtain this effect, that the abutment shoulder 14 embracing the entire series of segments 1 be accurately machined in the production of the blank so as to lie in exact concentricity with the axis of the bore 6 of the nut. This is more readily accomplished where the segments are formed as described with a narrow abutment shoulder.

Figure 6:
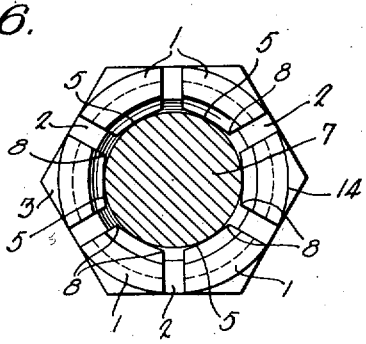
Figure 6 is a top plan and partial sectional view showing the finished nut applied to a bolt.

In Fig. 6, the finished nut is shown applied to a bolt 7, and it will be noted that the inner side edges 8 of the segments 1 are free from the close engagement with the bolt surfaces that would result in the aforedescribed undesirable scraping action. Actually, the clearance need be very slight, and for ordinary purposes I have found that a pitch diameter in the thread of the segments greater by .003" than the pitch diameter of the normal thread in the bore 6 of the nut will afford satisfactory results. This difference, while ordinarily sufficient to effect the desired result, does not in any material degree adversely affect the locking function of the segments or the close frictional engagement between the surfaces of the segments and bolt upon which that function largely depends.

There may be some modification of the procedure without departure from the invention.

I claim:

1. The method of manufacture, which consists in forming a nut having at one end a segmental extension forming a continuation of the solid wall of the nut body and resiliently movable with respect to said body in radial direction, threading the inner surface of said segment in continuation of the thread in the bore of the nut and with a thread of somewhat greater pitch diameter, and subsequently inwardly displacing the segment to a normal position constricting said bore.

2. The method of manufacture, which consists in forming a nut having at one end a plurality of longitudinal slots defining the sides of a plurality of segments constituting extensions of the solid wall of the nut body and resiliently movable with respect to said body in radial direction, threading the inner surfaces of said segments in continuation of the thread in the bore of the nut and with a thread of somewhat greater pitch diameter, and subsequently inwardly displacing the segments to a normal position constricting said bore.

3. The method of manufacture, which consists in forming a nut having at one end an annular extension with a narrow external shoulder concentric with the nut axis and with longitudinal slots dividing said extension in a plurality of segments resiliently movable in radial direction, threading the inner surfaces of said segments in continuation of the thread in the bore of the nut and with a thread of somewhat greater pitch diameter, and subsequently exterting radial pressure on said shoulder to uniformly displace the segments inwardly to a normal position constricting said bore.

4. The method of manufacture which consists in slotting a nut longitudinally so as to form at one end a plurality of segments forming continuations of the solid wall of the nut body and resiliently movable with respect to said body in radial direction, passing the nut over an elongated threaded mandrel to work off the burrs left by the slotting operation, rethreading the segmented end of the nut with a thread of somewhat greater pitch diameter than the original thread, and subsequently inwardly displacing the segments to normal position constricting said bore.

HARALD F. GADE.